(12) United States Patent
Gordon (10) Patent No.: US 10,805,578 B2
(45) Date of Patent: Oct. 13, 2020

(54) LUGGAGE INSURANCE PHOTO SERVICE MACHINE

(71) Applicant: Thomas Harold Gordon, Shawnee Mission, KS (US)

(72) Inventor: Thomas Harold Gordon, Shawnee Mission, KS (US)

( * ) Notice: Subject to any disclaimer, the term of this patent is extended or adjusted under 35 U.S.C. 154(b) by 0 days.

(21) Appl. No.: 16/548,360

(22) Filed: Aug. 22, 2019

(65) Prior Publication Data

US 2020/0053323 A1 Feb. 13, 2020

Related U.S. Application Data

(63) Continuation of application No. 15/985,819, filed on May 22, 2018, now abandoned.

(Continued)

(51) Int. Cl.
*G06F 3/12* (2006.01)
*G06Q 40/08* (2012.01)

(Continued)

(52) U.S. Cl.
CPC .......... *H04N 7/183* (2013.01); *G06F 3/1222* (2013.01); *G06F 3/1238* (2013.01); *G06Q 40/08* (2013.01);

(Continued)

(58) Field of Classification Search
CPC .. G06Q 10/0833; G06Q 40/08; G06T 1/0014; B64F 1/368; B64F 1/366; B65G 47/647;

(Continued)

(56) References Cited

U.S. PATENT DOCUMENTS 4,882,498 A * 11/1989 Cochran ............ G01N 21/8806
250/559.04
4,884,289 A * 11/1989 Glockmann ......... G01V 5/0025
378/57

(Continued)

FOREIGN PATENT DOCUMENTS

WO 2011076536 6/2011

OTHER PUBLICATIONS

Office Action in corresponding U.S. Appl. No. 15/985,819, dated Aug. 23, 2018.

(Continued)

*Primary Examiner* — Chad Dickerson
(74) *Attorney, Agent, or Firm* — Hovey Williams LLP (57) ABSTRACT

The luggage insurance photo service machine is configured for use with a bailment. The luggage insurance photo service machine: 1) captures one or more images of bail associated with the bailment; 2) registers the captured one or more images with a registrar; and, 3) upon successful registration of the bail provides to the bailor physical documentation of the registration. The luggage insurance photo service machine comprises a housing, a recording device, a commercially provided and publically available network, and a registrar. The recording device is contained within the housing. The commercially provided and publically available network provides communication service between the recording device and the registrar. The bail is placed within the housing to allow the recording device to capture the one or more images of the bail.

15 Claims, 5 Drawing Sheets

Related U.S. Application Data (60) Provisional application No. 62/547,706, filed on Aug. 18, 2017.

(51) Int. Cl.
    *H04N 7/18*       (2006.01)
    *G06T 1/00*       (2006.01)
    *H04N 5/76*       (2006.01)
    *B64F 1/36*       (2017.01)

(52) U.S. Cl.
    CPC ............ *G06T 1/0014* (2013.01); *H04N 5/76* (2013.01); *B64F 1/366* (2013.01); *G06F 3/1285* (2013.01)

(58) Field of Classification Search
    CPC ............ B65G 2201/0264; B65G 21/12; H04N 7/183; H04N 5/76
    USPC .......... 358/1.11–1.18, 1.1, 400–404; 378/57, 378/203; 177/245; 382/103, 100; 312/291, 296, 310, 270.2
    See application file for complete search history.

(56) References Cited

U.S. PATENT DOCUMENTS

| | | | |
|---|---|---|---|
| 5,299,116 A | 3/1994 | Owens et al. | |
| 5,793,639 A * | 8/1998 | Yamazaki | B64F 1/366 700/226 |
| 6,872,001 B1 * | 3/2005 | Gilevich | G21F 7/005 378/203 |
| 7,139,406 B2 | 11/2006 | McClelland et al. | |
| D612,884 S | 3/2010 | Gassman et al. | |
| 9,398,795 B2 | 7/2016 | Grupta et al. | |
| 9,479,656 B2 | 10/2016 | Lin | |
| 9,714,099 B2 * | 7/2017 | Dinkelmann | G06Q 10/08 |
| 2002/0186862 A1 * | 12/2002 | McClelland | B64F 1/368 382/100 |
| 2005/0007624 A1 * | 1/2005 | Henry | H04N 1/2183 358/1.15 |
| 2006/0280286 A1 * | 12/2006 | Kaval | G01N 23/04 378/57 |
| 2007/0133742 A1 * | 6/2007 | Gatten | G01N 23/046 378/57 |
| 2007/0168467 A1 | 7/2007 | Hu et al. | |
| 2007/0200566 A1 * | 8/2007 | Clark | G01V 5/0008 324/318 |
| 2008/0253514 A1 * | 10/2008 | Panesar | G01V 5/0016 378/57 |
| 2010/0018839 A1 * | 1/2010 | Tan | B64F 1/366 198/507 |
| 2010/0245901 A1 * | 9/2010 | Kitaguchi | H04N 1/00132 358/1.15 |
| 2012/0177176 A1 * | 7/2012 | Carver | G01N 23/04 378/57 |
| 2012/0263350 A1 | 10/2012 | Delianski | |
| 2013/0211864 A1 * | 8/2013 | Sanderson | G06Q 10/02 705/5 |
| 2013/0241712 A1 * | 9/2013 | Motley, III | G06K 7/10009 340/10.51 |
| 2013/0268454 A1 * | 10/2013 | Mateer | G06Q 50/28 705/330 |
| 2015/0096813 A1 * | 4/2015 | Aumente | B64F 1/366 177/245 |
| 2015/0186732 A1 * | 7/2015 | Perron | G01V 5/0016 382/103 |
| 2015/0186840 A1 * | 7/2015 | Torres | A47F 10/02 705/339 |
| 2017/0004384 A1 * | 1/2017 | Audo | G06K 9/00 |
| 2017/0004444 A1 * | 1/2017 | Krasko | G06Q 10/0833 |

OTHER PUBLICATIONS

Office Action in corresponding U.S. Appl. No. 15/985,819, dated Dec. 10, 2018.

Office Action in corresponding U.S. Appl. No. 15/985,819, dated Mar. 25, 2019.

\* cited by examiner

FIG. 5

LUGGAGE INSURANCE PHOTO SERVICE MACHINE

CROSS-REFERENCE TO RELATED APPLICATIONS

This application is a continuation of U.S. Ser. No. 15/985,819, filed May 22, 2018, and incorporated by reference herein in its entirety, which claims the priority benefit of U.S. Provisional Ser. No. 62/547,706, filed Aug. 18, 2017.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments including database structures and information retrieval, more specifically, an image based recording system configured for use in documenting bailment.

SUMMARY OF INVENTION

The luggage insurance photo service machine is a recording instrument. The luggage insurance photo service machine is configured for use with a bailment. The luggage insurance photo service machine: 1) captures one or more images of bail associated with the bailment; 2) registers the captured one or more images with a registrar; and, 3) upon successful registration of the bail provides to the bailor physical documentation of the registration. The physical documentation can include but is but not limited to: 1) a time-stamped confirmation of receipt of the registration; and, 2) physical copies of the one or more images captured by the luggage insurance photo service machine. The luggage insurance photo service machine comprises a housing, a recording device, a commercially provided and publically available network, and a registrar. The recording device is contained within the housing. The commercially provided and publically available network provides communication service between the recording device and the registrar. The bail is placed within the housing to allow the recording device to capture the one or more images of the bail.

These together with additional objects, features and advantages of the luggage insurance photo service machine will be readily apparent to those of ordinary skill in the art upon reading the following detailed description of the presently preferred, but nonetheless illustrative, embodiments when taken in conjunction with the accompanying drawings.

In this respect, before explaining the current embodiments of the luggage insurance photo service machine in detail, it is to be understood that the luggage insurance photo service machine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the luggage insurance photo service machine.

It is therefore important that the claims be regarded as including such equivalent construction insofar as they do not depart from the spirit and scope of the luggage insurance photo service machine. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
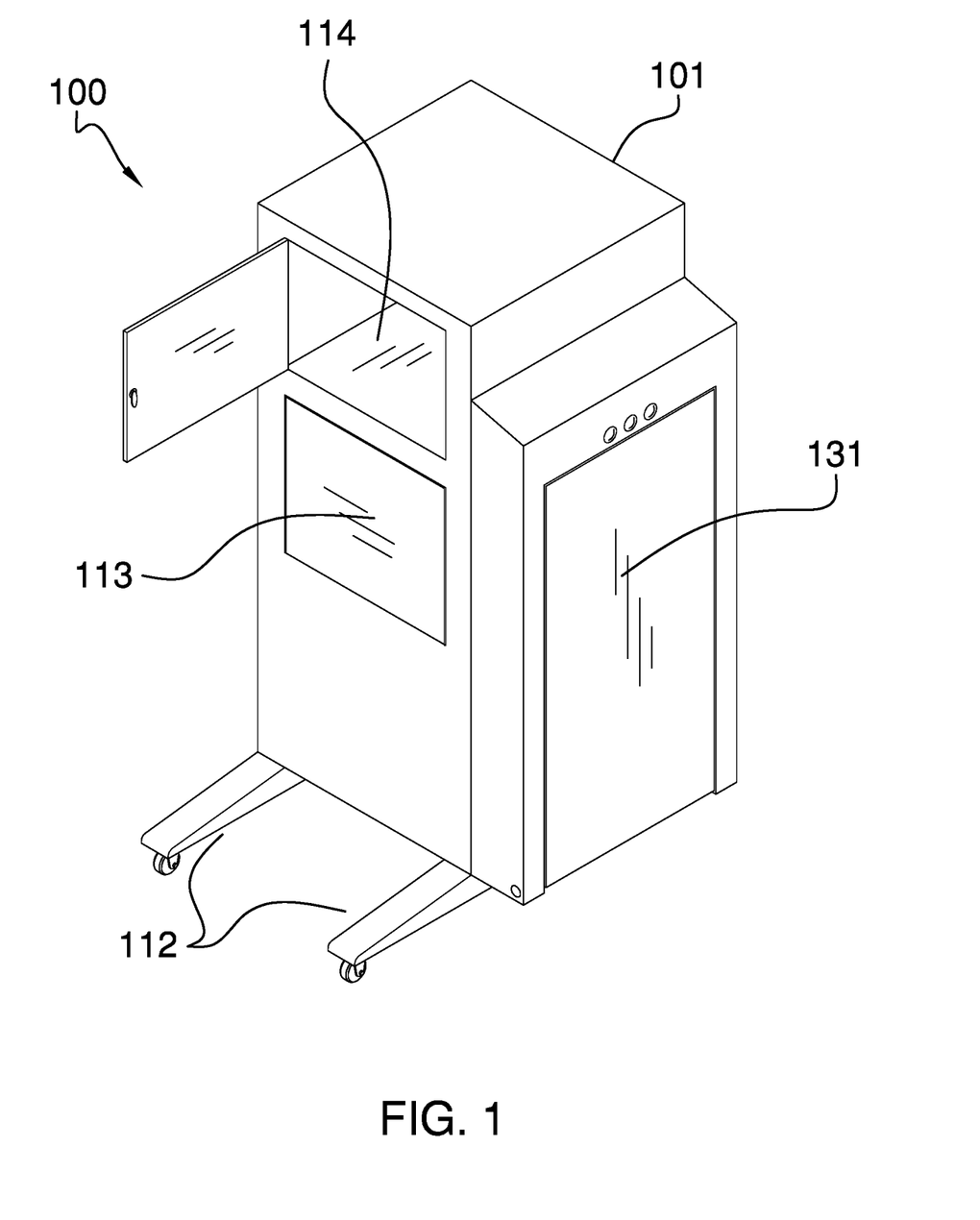
FIG. 1 is a perspective storage view of an embodiment of the disclosure.
Figure 2:
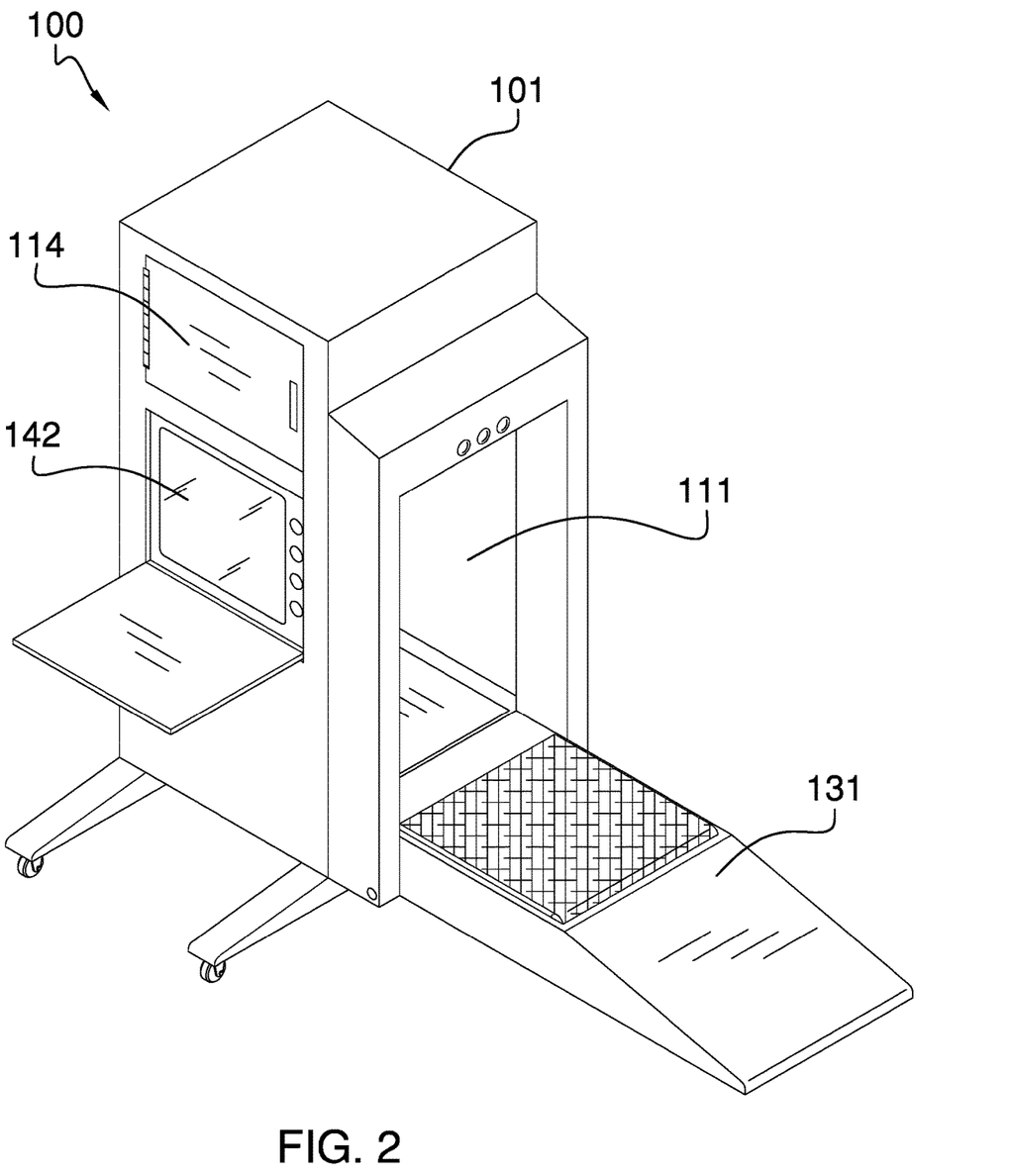
FIG. 2 is a perspective operating view of an embodiment of the disclosure.
Figure 3:
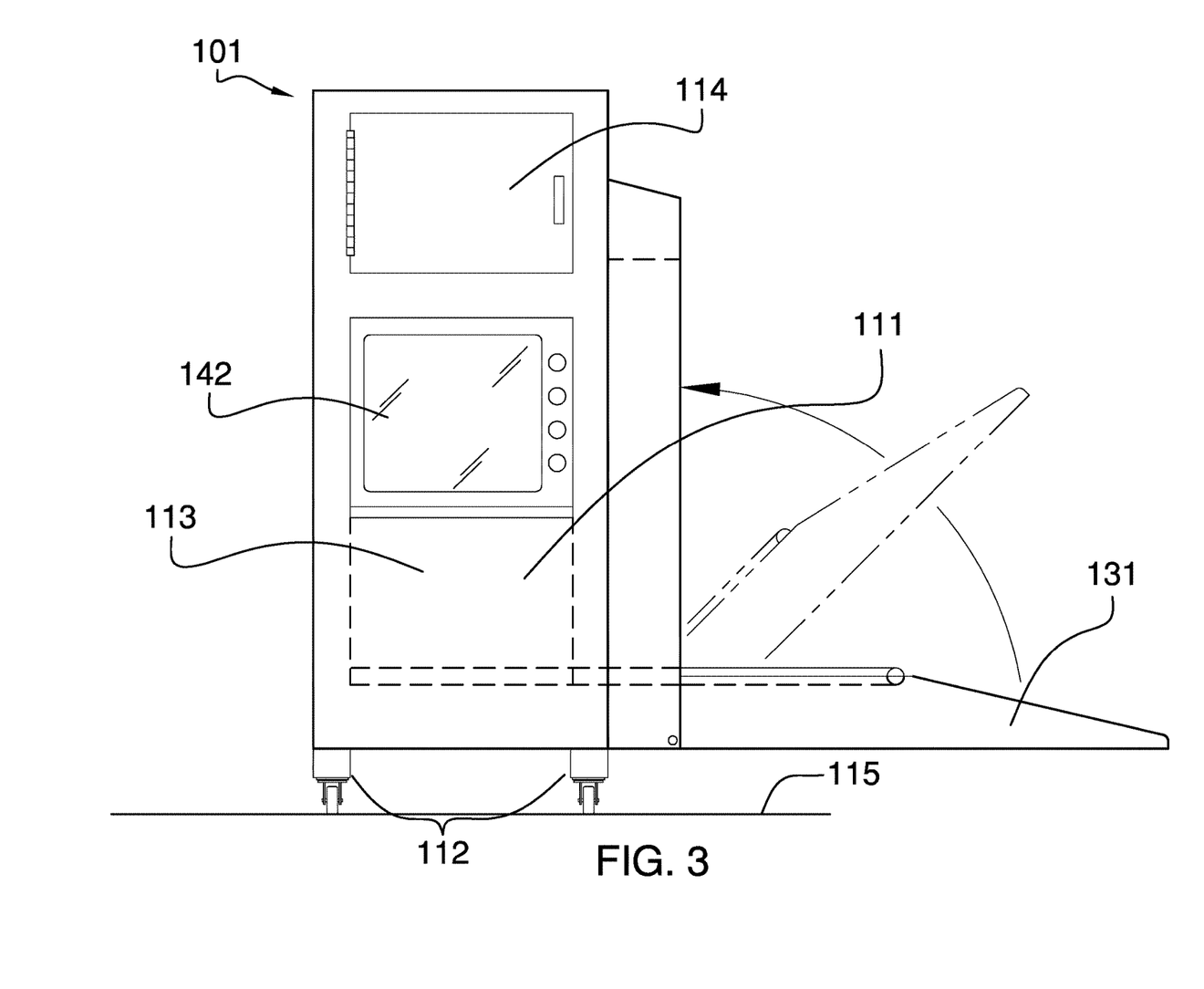
FIG. 3 is a front view of an embodiment of the disclosure.
Figure 4:
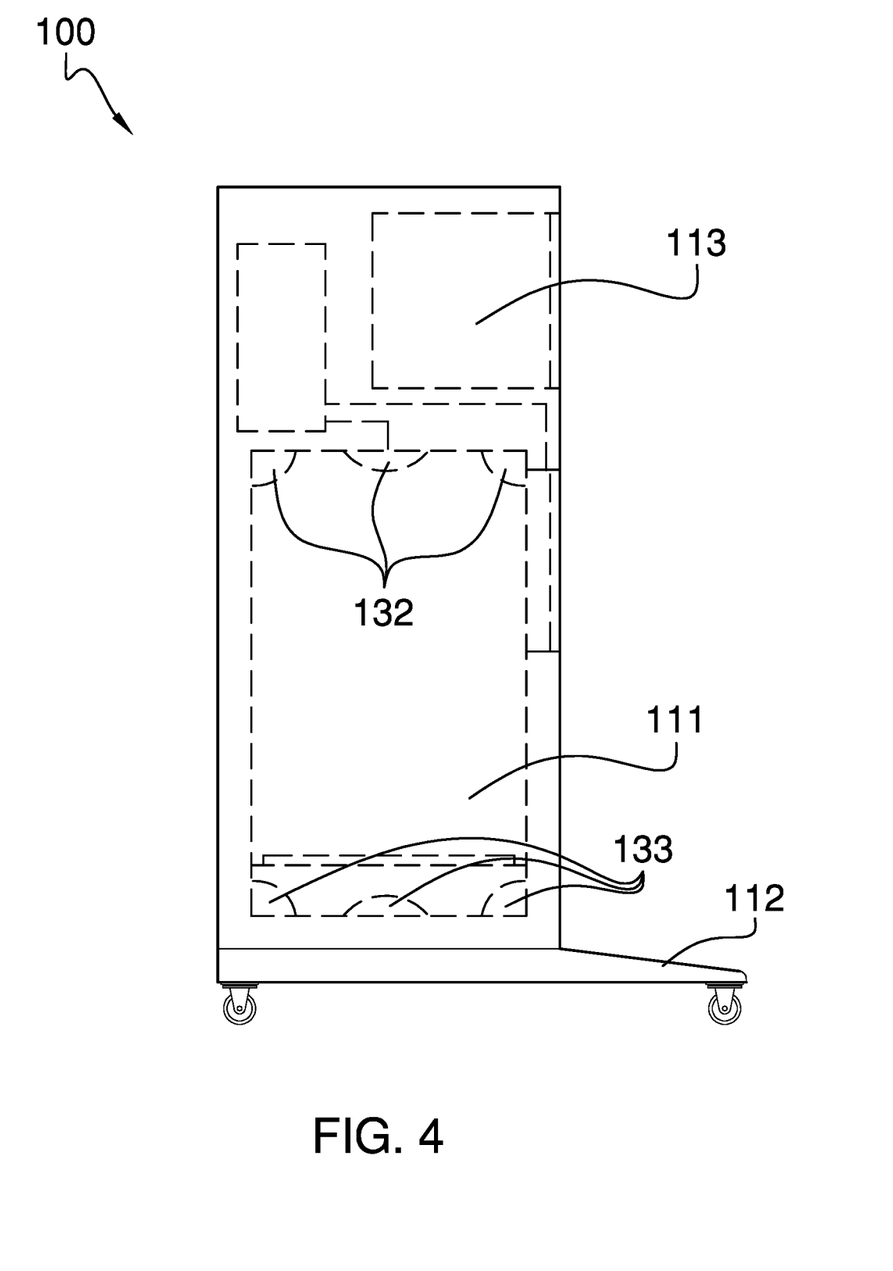
FIG. 4 is a side view of an embodiment of the disclosure.
Figure 5:
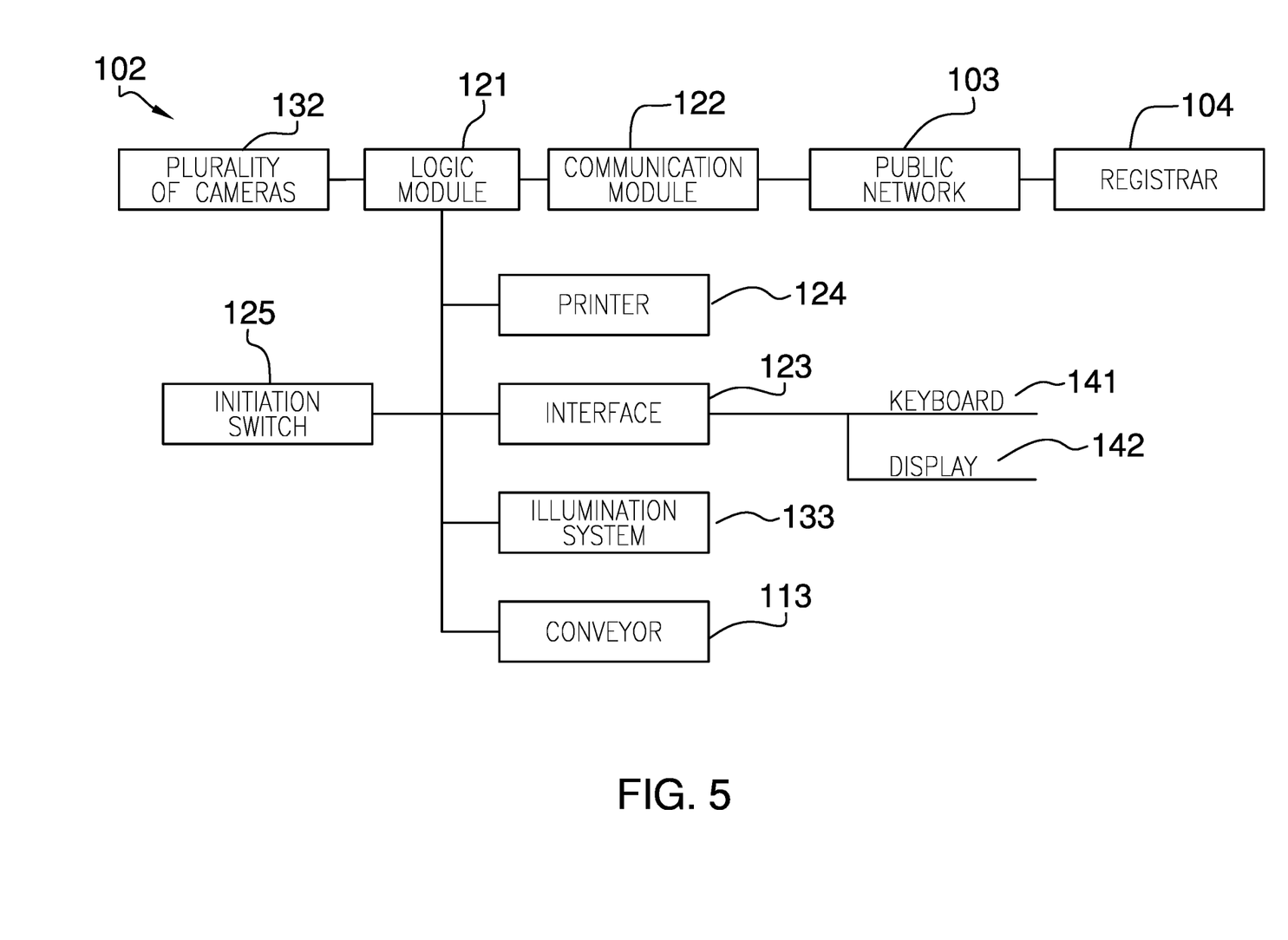
FIG. 5 is a block diagram of an embodiment of the disclosure.

Detailed reference will now be made to one or more potential embodiments of the disclosure, which are illustrated in FIGS. 1 through 5.

The luggage insurance photo service machine 100 (hereinafter invention) is a recording instrument. The invention 100 is configured for use with a bailment. The invention 100: 1) captures one or more images of bail 151 associated with the bailment; 2) registers the captured one or more images with a registrar 104; and, 3) upon successful registration of the bail 151 provides to the bailor physical documentation of the registration. The physical documentation can include but is but not limited to: 1) a time-stamped confirmation of receipt of the registration; and, 2) physical copies of the one or more images captured by the invention 100. A time-stamp is always provided with the physical documentation. The invention 100 comprises a housing 101, a recording device 102, a commercially provided and publically available network 103, and the registrar 104. The recording device 102 is contained within the housing 101. The commercially provided and publically available network 103 provides communication service between the recording device 102 and the registrar 104. The bail 151 is placed within the housing 101 to allow the recording device 102 to capture the one or more images of the bail 151. The first potential embodiment of the disclosure is configured such that: 1) luggage is the bail 151; 2) a traveler is the bailor; and, 3) a carriage company is the bailee.

The housing 101 is a shell. The housing 101 contains the recording device 102 and the bail 151 during the recording process. The housing 101 is formed with all apertures and form factors necessary to allow the housing 101 to accommodate the use and operation of the invention 100. The housing 101 comprises a recording chamber 111, a dolly 112, an interface 123 panel 113, a storage chamber 114, and a supporting surface 115.

The supporting surface 115 is a horizontal surface upon which the invention 100 is placed. This disclosure assumes that the supporting surface 115 is a smooth surface over which the invention 100 rolls.

The recording chamber 111 is an enclosed space. The recording chamber 111 stores the bail 151 while the recording device 102 records the one or more images of the bail 151. The recording chamber 111 comprises a conveyor 131, a plurality of image sensors 132, and an illumination system 133.

The conveyor 131 is a commercially available driven belt device that is used to transport the bail 151 into and out of the conveyor 131. As shown most clearly in FIG. 2, the conveyor 131 rotates such that access to the recording chamber 111 is blocked when the invention 100 is not in operation.

Each of the plurality of image sensors 132 is a camera that captures an image of the bail 151. The plurality of image sensors 132 mount in the interior space formed by the recording chamber 111. The field of view of each of the plurality of image sensors 132 provides an image of the bail 151 from a distinct and identifiable angle.

In the first potential embodiment of the disclosure, the applicant prefers that the field of view of any first image sensor selected from the plurality of image sensors 132 overlaps with the field of view of one or more image sensors remaining in the plurality of image sensors 132.

The illumination system 133 comprises a plurality of lamps that are installed in the recording chamber 111. The field of illumination of each lamp within the illumination system 133 corresponds to the field of view of one or more image sensors selected from the plurality of image sensors 132 such that each of the one or more images captured by the plurality of image sensors 132 is properly illuminated.

The dolly 112 is a pedestal structure that forms the final link in the load path of the invention 100. The dolly 112 is a cart that comprises a plurality of casters used to roll the invention 100 to its operating location. Methods to design and build a dolly 112 are well known and documented in the mechanical arts. The interface 123 panel 113 is a rotating closure. The interface 123 panel 113 encloses the interface 123 when the invention 100 is not in use. The storage chamber 114 is a lockable chamber in which a printer 124, the logs, and the supplies related to the registration process are secured when the invention 100 is not in use.

The commercially provided and publicly available network 103 is a communication channel that supports the electronic communication between the recording device 102 and the registrar 104. In the first potential embodiment of the disclosure, the commercially provided and publicly available network 103 is an encrypted internet connection.

In the first potential embodiment of the disclosure, the registrar 104 is a supplemental service that: 1) registers the receipt of the one or more images of the bail 151; and, 2) sends the recording device 102 a confirmation of the successful receipt and registration of the one or more images of the bail 151. The identity of the registrar 104 is selected from the group consisting of: 1) a party to the bailment; and, 2) an independent party.

The recording device 102 is an electronic device. The recording device 102 controls the operation of the invention 100. The recording device 102: 1) controls access into the housing 101; 2) records the one or more images of the bail 151; 3) transmits the recording of the one or more images of the bail 151 to the registrar 104; and 4) receives and prints the registration confirmation from the registrar 104 of the successful registration of the one or more images of the bail 151. The recording device 102 comprises a logic module 121, a communication module 122, an interface 123, a printer 124, and an initiation switch 125.

The logic module 121 is a readily and commercially available programmable electronic device that is used to manage, regulate, and operate the recording device 102. Depending on the specific design and the selected components, the logic module 121 can be a separate component within the recording device 102 or the functions of the logic module 121 can be incorporated into another component within the recording device 102.

Each of the plurality of image sensors 132 electrically connects to the logic module 121 of the recording device 102. Each of the plurality of image sensors 132 electrically connects to the logic module 121. Each of the plurality of image sensors 132 receives light from the illumination system 133 and converts the received light into a digital representation of sufficient detail to allow the logic module 121 to create and display a visual reproduction of the source of the captured light. Methods to use an image sensor with a logic module 121 are well-known and documented in the electrical arts.

The illumination system 133 is controlled and operated by the logic module 121.

The communication module 122 is a commercially available electrical device. The communication module 122 communicates messages between the logic module 121 and the registrar 104 through a commercially provided and publicly available network 103. The use of a commercially provided and publicly available network 103 is preferred because: 1) of its low cost; 2) of the widespread availability and the broad interoperability between competing commercially provided and publicly available networks 103; and, 3) methods and techniques to send messages over a commercially provided and publicly available network 103 are well known and documented by those skilled in the electrical arts.

The interface 123 comprises a plurality of electronic devices that: 1) delivers operational messages from the recording device 102 to an operator; and, 2) transmits operational instructions from the operator to the recording device 102. The interface 123 comprises well-known and documented interface devices associated with commercially available logical devices. The interface 123 comprises a keyboard 141 and a display 142.

The keyboard 141 is a commercially available device through which operating instructions are provided to the logic module 121. The display 142 is an electronic device that displays operating messages from the logic module 121. The display 142 is also used to display the one or more images during capture.

The printer 124 is a commercially available printing device. The printer 124 produces the documentation associated with the confirmation of the registration of the one or more images of the bail 151 with the registrar 104. The printer 124 may or may not produce a copy of the one or more images as a part of the registration process.

The initiation switch 125 is a commercially available electrical switch. The initiation switch 125 is a maintained switch that initiates the operation when activated. The initiation of the invention 100 comprises: 1) powering up the recording device 102 including rotating the interface 123 panel to provide access to the interface 123; and, 2) rotating the conveyor 131 into a position such that the bail 151 can be loaded and unloaded into and out of the recording chamber 111.

The following definitions were used in this disclosure:

Bail: As used in this disclosure, the term bail refers to an object that is owned by a first person and that is transferred into the custody or a second person without the transfer of the ownership of the object. The first person is referred to as the bailor and the second person is referred to as the bailee. An agreement that describes or documents terms and conditions of the transfer of bail between the bailor and the bailee is referred to as the bailment.

Camera: As used in this disclosure, a camera is a sensor that converts light into electric signals that encode and records the spatial orientation of the captured light in a manner that reproduces the images seen by a human eye.

Cargo: As used in this disclosure, cargo refers to one or more objects that are intended to be transported using a vehicle.

Carriage Company: As used in this disclosure, a carriage company is an entity that for a fee will transport one or more items selected from the group consisting of passengers, luggage, and cargo.

Cart: A small vehicle that can be easily moved by a person.

Caster: As used in this disclosure, a caster is a wheel that is mounted on a swivel that allows the wheel to adjust, or swivel, the direction of rotation of the wheel to the direction of motion desired for the wheel.

Chamber: As used in this disclosure, a chamber is an enclosed or enclosable space that is dedicated to a purpose.

Closed Position: As used in this disclosure, a closed position refers to a movable barrier structure that is in an orientation that prevents passage through a port or an aperture. The closed position is often referred to as an object being "closed."

Display: As used in this disclosure, a display is a surface upon which is presented an image, potentially including, but not limited to, graphic images and text, that is interpretable by an individual viewing the projected image in a meaningful manner.

Dolly: As used in this disclosure, a dolly refers to a mobile platform, generally mounted on casters, that is used to move a load or an object.

Field of Illumination: As used in this disclosure, a field of illumination refers to an area illuminated by electromagnetic radiation projected from an electrical device such as a lamp or transmission antenna.

Field of View: As used in this disclosure, a field of view refers to one or more angles which delimits an area from which electromagnetic radiation will be sensed by a person or an image sensor.

Form Factor: As used in this disclosure, the term form factor refers to the size and shape of an object.

Framework: As used in this disclosure, a framework refers to the substructure of an object that carries the load path of the object.

Housing: As used in this disclosure, a housing is a rigid casing that encloses and protects one or more devices.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone.

Image Sensor: As used in this disclosure, an image sensor receives light from the exterior of the image sensor and converts the received light into a digital representation of sufficient detail to allow a logic module to create and display a visual reproduction of the source of the captured light.

Instrument: As used in this disclosure, an instrument is a device used for measuring a physical phenomenon.

Interface: As used in this disclosure, an interface is a physical or virtual boundary that separates two different systems across which information is exchanged.

Keyboard: As used in this disclosure, a keyboard is a panel that further comprises a plurality of buttons that are commonly referred to as keys. The keyboard is commonly used to operate devices including, but not limited to, logical devices and musical instruments.

Lamp: As used in this disclosure, a lamp is an electrical device that generates visible light to illuminate objects so they can be seen.

Load Path: As used in this disclosure, a load path refers to a chain of one or more structures that transfers a load generated by a raised structure or object to a foundation, supporting surface, or the earth.

Lock: As used in this disclosure, a lock is a device that prevents the unauthorized operation or use of a device.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Logical Device: As used in this disclosure, a logical device is a programmable electrical device that processes externally provided inputs to generate outputs determined from a previously programmed set of instructions.

Luggage: As used in this disclosure, luggage is a trunk, bag, parcel, suitcase, or backpack in which domestic articles are contained during travel.

Maintained Switch: A used in this disclosure, a maintained switch is a switch that maintains the position that was set in the most recent switch actuation. A maintained switch works in an opposite manner to a momentary switch.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pedestal: As used in this disclosure, a pedestal is an intermediary load bearing structure that that transfers a load path between a supporting surface and an object, structure, or load.

Printer: As used in this disclosure, a printer is a device that receives text or graphical output from a computer and transfers the information to paper.

Roll: As used in this disclosure, the term roll refers to the motion of an object that is facilitated by the rotation of one or more wheels or casters.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Shell: As used in this disclosure, a shell is a structure that forms an outer covering intended to contain an object. Shells are often, but not necessarily, rigid or semi-rigid structures that are intended to protect the object contained within it.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Vehicle: As used in this disclosure, a vehicle is a device used for transporting passengers, goods, or equipment.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A bailment registration system for registering a bail item, wherein said bailment registration system comprises:
   a housing configured to be supported by a mobile platform on a supporting surface and presenting a recording chamber configured to receive the bail item,
   wherein said housing includes a closure for opening and closing the recording chamber,
   wherein said closure comprises a conveyor configured to transport the bail item into and out of the recording chamber,
   wherein said closure is operably coupled to a base of said housing, such that said closure is configured to actuate between a closed position, in which said closure closes the recording chamber, and an open position, in which said closure opens the recording chamber,
   wherein when said closure is in the open position, said closure extends above and adjacent to the supporting surface so as to be configured to support the bail item;
   a plurality of image sensors positioned within the recording chamber of said housing,
   wherein said image sensors are configured with overlapping fields of view to obtain image data representative of the bail item; and
   a control system for controlling operation of said bailment registration system, wherein said control system comprises—
   a communication element;
   a programmable electronic device in communication with said plurality of image sensors, wherein said programmable electronic device is configured to receive and process the image data and to provide one or more digital images of the bail item to the communication element,
   wherein the communication element is configured to transmit the one or more digital images of the bail item to a registrar such that the registrar can register a bailment of the bail item,
   wherein the communication element is additionally configured to receive a registration confirmation from the registrar;
   a printing device configured to print a physical receipt confirming registration of the bail item with the registrar,
   wherein the receipt includes a time stamp confirming a time of registration of the bail item and physical copies of the one or more digital images of the bail item; and
   an initiation switch configured to initiate operation of said bailment registration system, wherein when said initiation switch is activated, power is provided to said control system and said closure is actuated from the closed position to the open position to provide access to the recording chamber.

2. The bailment registration system of claim 1, wherein the bail item is a piece of luggage.

3. The bailment registration system of claim 1, wherein said conveyor comprises a driven belt conveyor.

4. The bailment registration system of claim 1, wherein said image sensors comprise cameras.

5. The bailment registration system of claim 1, further comprising a plurality of lamps positioned within the recording chamber of said housing and configured to generate light to illuminate the bail item.

6. The bailment registration system of claim 5, wherein said programmable logic device is configured to control operation of said lamps.

7. The bailment registration system of claim 1, wherein said communication element is configured to transmit the one or more digital image of the bail item over an encrypted network.

8. The bailment registration system of claim 1, wherein said mobile platform comprising a plurality of wheels.

9. The bailment registration system of claim 1, further comprising an interface positioned on an exterior of said housing, wherein said interface is configured to receive operational instructions from an operator of said bailment registration system.

10. The bailment registration system of claim 9, wherein said interface is further configured to present operational information and the one or more images of the bail item to the operator of said bailment registration system.

11. The bailment registration system of claim 9, further comprising an interface panel configured to enclose said interface when said bailment registration system is not in use.

12. The bailment registration system of claim 11, wherein when said initiation switch is activated, said interface panel is rotated to an open position to provide access to said interface.

13. The bailment registration system of claim 1, further comprising a storage chamber configured to receive said printer, wherein said storage chamber is lockable.

14. A method for registering a bail item into a bailment with a registrar, wherein said method comprises the steps of:
(a) providing a bailment registration system comprising a housing, wherein the housing is configured to be supported by a mobile platform on a supporting surface and presents a recording chamber configured to receive the bail item;
(b) activating an initiation switch to initiate operation of the bailment registration system, wherein upon said activating of step (b), a closure of the housing is actuated to an open position to provide access to the recording chamber,
wherein the closure comprises a conveyor configured to transport the bail item into and out of the recording chamber,
wherein the closure is operably coupled to a base of the housing, such that the closure is configured to actuated between a closed position, in which the closure closes the recording chamber, and the open position, in which the closure opens the recording chamber,
wherein when the closure is in the open position, the closure extends above and adjacent to the supporting surface so as to be configured to support the bail item;
(c) receiving the bail item within the recording chamber;
(d) obtaining one or more digital images of the bail item using one or more image sensors positioned within the recording chamber;
(e) transmitting, via a communications element, the one or more digital images to a registrar for registration;
(f) receiving, via the communications element, a confirmation from the registrar that the bail item has been registered;
(g) printing, via a printing device, a physical receipt confirming registration of the bail item with the registrar, wherein the receipt includes a time stamp confirming a time of registration of the bail item and physical copies of the one or more digital images of the bail item.

15. The method of claim 14, wherein said receiving of step (c) includes receiving the bail item on the closure with the closure in the open position and transporting the bail item into the recording chamber, wherein said closure comprises a drive belt conveyor.

* * * * *